US008230433B2

(12) United States Patent
Chiu et al.

(10) Patent No.: US 8,230,433 B2
(45) Date of Patent: Jul. 24, 2012

(54) SHARED PERFORMANCE MONITOR IN A MULTIPROCESSOR SYSTEM

(75) Inventors: George Chiu, Cross River, NY (US); Alan G. Gara, Mount Kisco, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1428 days.

(21) Appl. No.: 11/768,777

(22) Filed: Jun. 26, 2007

(65) Prior Publication Data

US 2009/0007134 A1    Jan. 1, 2009

(51) Int. Cl.
G06F 9/46 (2006.01)
G06F 11/00 (2006.01)
G06F 9/00 (2006.01)

(52) U.S. Cl. .......... 718/104; 714/47.1; 714/39; 712/227
(58) Field of Classification Search ........................ None
See application file for complete search history.

(56) References Cited

U.S. PATENT DOCUMENTS

| | | | |
|---|---|---|---|
| 4,777,595 A | 10/1988 | Strecker et al. | |
| 5,063,562 A | 11/1991 | Barzilai et al. | |
| 5,142,422 A | 8/1992 | Zook et al. | |
| 5,349,587 A | 9/1994 | Nadeau-Dostie et al. | |
| 5,353,412 A | 10/1994 | Douglas et al. | |
| 5,452,432 A | 9/1995 | Macachor | |
| 5,524,220 A | 6/1996 | Verma et al. | |
| 5,615,135 A | 3/1997 | Waclawsky et al. | |
| 5,634,007 A | 5/1997 | Calta et al. | |
| 5,659,710 A | 8/1997 | Sherman et al. | |
| 5,708,779 A | 1/1998 | Graziano et al. | |
| 5,761,464 A | 6/1998 | Hopkins | |
| 5,796,735 A | 8/1998 | Miller et al. | |
| 5,809,278 A | 9/1998 | Watanabe et al. | |
| 5,825,748 A | 10/1998 | Barkey et al. | |
| 5,890,211 A | 3/1999 | Sokolov et al. | |
| 5,917,828 A | 6/1999 | Thompson | |

(Continued)

OTHER PUBLICATIONS

Definition of "mechanism", Oxford English Dictionary, dictionary.oed.com/cgi/entry/00304337?query_type=word&queryword=mechanism&first=1&max_to_show=10&sort_type=alpha&result_place=2&search_id=y2atEIGc-11603&hilite+00304337.

(Continued)

Primary Examiner — Camquy Truong
(74) Attorney, Agent, or Firm — Scully, Scott, Murphy & Presser, P.C.; Daniel P. Morris, Esq.

(57) ABSTRACT

A performance monitoring unit (PMU) and method for monitoring performance of events occurring in a multiprocessor system. The multiprocessor system comprises a plurality of processor devices units, each processor device for generating signals representing occurrences of events in the processor device, and, a single shared counter resource for performance monitoring. The performance monitor unit is shared by all processor cores in the multiprocessor system. The PMU comprises: a plurality of performance counters each for counting signals representing occurrences of events from one or more the plurality of processor units in the multiprocessor system; and, a plurality of input devices for receiving the event signals from one or more processor devices of the plurality of processor units, the plurality of input devices programmable to select event signals for receipt by one or more of the plurality of performance counters for counting, wherein the PMU is shared between multiple processing units, or within a group of processors in the multiprocessing system. The PMU is further programmed to monitor event signals issued from non-processor devices.

13 Claims, 12 Drawing Sheets

U.S. PATENT DOCUMENTS

| | | | |
|---|---|---|---|
| 6,023,732 A | 2/2000 | Moh et al. | |
| 6,061,511 A | 5/2000 | Marantz et al. | |
| 6,072,781 A | 6/2000 | Feeney et al. | |
| 6,112,318 A * | 8/2000 | Jouppi et al. | 714/47.1 |
| 6,122,715 A | 9/2000 | Palanca et al. | |
| 6,185,214 B1 | 2/2001 | Schwartz et al. | |
| 6,219,300 B1 | 4/2001 | Tamaki | |
| 6,263,397 B1 | 7/2001 | Wu et al. | |
| 6,295,571 B1 | 9/2001 | Scardamalia et al. | |
| 6,311,249 B1 | 10/2001 | Min et al. | |
| 6,324,495 B1 | 11/2001 | Steinman | |
| 6,356,106 B1 | 3/2002 | Greeff et al. | |
| 6,366,984 B1 | 4/2002 | Carmean et al. | |
| 6,442,162 B1 | 8/2002 | O'Neill et al. | |
| 6,466,227 B1 | 10/2002 | Pfister et al. | |
| 6,564,331 B1 | 5/2003 | Joshi | |
| 6,594,234 B1 | 7/2003 | Chard et al. | |
| 6,598,123 B1 | 7/2003 | Anderson et al. | |
| 6,601,144 B1 | 7/2003 | Arimilli et al. | |
| 6,631,447 B1 | 10/2003 | Morioka et al. | |
| 6,647,428 B1 | 11/2003 | Bannai et al. | |
| 6,662,305 B1 | 12/2003 | Salmon et al. | |
| 6,718,403 B2 * | 4/2004 | Davidson et al. | 710/19 |
| 6,735,174 B1 | 5/2004 | Hefty et al. | |
| 6,775,693 B1 | 8/2004 | Adams | |
| 6,799,232 B1 | 9/2004 | Wang | |
| 6,880,028 B2 | 4/2005 | Kurth | |
| 6,889,266 B1 | 5/2005 | Stadler | |
| 6,894,978 B1 | 5/2005 | Hashimoto | |
| 6,954,887 B2 | 10/2005 | Wang et al. | |
| 6,986,026 B2 | 1/2006 | Roth et al. | |
| 7,007,123 B2 | 2/2006 | Golla et al. | |
| 7,058,826 B2 | 6/2006 | Fung | |
| 7,065,594 B2 | 6/2006 | Ripy et al. | |
| 7,143,219 B1 | 11/2006 | Chaudhari et al. | |
| 7,191,373 B2 | 3/2007 | Wang et al. | |
| 7,239,565 B2 | 7/2007 | Liu | |
| 7,280,477 B2 | 10/2007 | Jeffries et al. | |
| 7,298,746 B1 | 11/2007 | De La Iglesia et al. | |
| 7,363,629 B2 | 4/2008 | Springer et al. | |
| 7,373,420 B1 | 5/2008 | Lyon | |
| 7,401,245 B2 | 7/2008 | Fischer et al. | |
| 7,454,640 B1 | 11/2008 | Wong | |
| 7,454,641 B2 | 11/2008 | Connor et al. | |
| 7,461,236 B1 | 12/2008 | Wentzlaff | |
| 7,461,383 B2 | 12/2008 | Gara et al. | |
| 7,463,529 B2 | 12/2008 | Matsubara | |
| 7,539,845 B1 | 5/2009 | Wentzlaff et al. | |
| 7,613,971 B2 | 11/2009 | Asaka | |
| 7,620,791 B1 | 11/2009 | Wentzlaff et al. | |
| 7,698,581 B2 | 4/2010 | Oh | |
| 7,996,839 B2 * | 8/2011 | Farkas et al. | 718/102 |
| 2001/0055323 A1 | 12/2001 | Rowett et al. | |
| 2002/0078420 A1 | 6/2002 | Roth et al. | |
| 2002/0087801 A1 | 7/2002 | Bogin et al. | |
| 2002/0100020 A1 | 7/2002 | Hunter et al. | |
| 2002/0129086 A1 | 9/2002 | Garcia-Luna-Aceves et al. | |
| 2002/0138801 A1 | 9/2002 | Wang et al. | |
| 2002/0156979 A1 | 10/2002 | Rodriguez | |
| 2002/0184159 A1 | 12/2002 | Tadayon et al. | |
| 2003/0007457 A1 | 1/2003 | Farrell et al. | |
| 2003/0028749 A1 | 2/2003 | Ishikawa et al. | |
| 2003/0050714 A1 | 3/2003 | Tymchenko | |
| 2003/0050954 A1 | 3/2003 | Tayyar et al. | |
| 2003/0074616 A1 | 4/2003 | Dorsey | |
| 2003/0105799 A1 | 6/2003 | Khan et al. | |
| 2003/0163649 A1 | 8/2003 | Kapur et al. | |
| 2003/0177335 A1 | 9/2003 | Luick | |
| 2003/0188053 A1 | 10/2003 | Tsai | |
| 2003/0235202 A1 | 12/2003 | Van Der Zee et al. | |
| 2004/0003184 A1 | 1/2004 | Safranek et al. | |
| 2004/0019730 A1 | 1/2004 | Walker et al. | |
| 2004/0024925 A1 | 2/2004 | Cypher et al. | |
| 2004/0073780 A1 | 4/2004 | Roth et al. | |
| 2004/0103218 A1 | 5/2004 | Blumrich et al. | |
| 2004/0210694 A1 | 10/2004 | Shenderovich | |
| 2004/0243739 A1 | 12/2004 | Spencer | |
| 2005/0007986 A1 | 1/2005 | Malladi et al. | |
| 2005/0053057 A1 | 3/2005 | Deneroff et al. | |
| 2005/0076163 A1 | 4/2005 | Malalur | |
| 2005/0160238 A1 | 7/2005 | Steely et al. | |
| 2005/0216613 A1 | 9/2005 | Ganapathy et al. | |
| 2005/0251613 A1 | 11/2005 | Kissell | |
| 2005/0262333 A1 | 11/2005 | Gat | |
| 2005/0270886 A1 | 12/2005 | Takashima | |
| 2005/0273564 A1 | 12/2005 | Lakshmanamurthy et al. | |
| 2006/0050737 A1 | 3/2006 | Hsu | |
| 2006/0080513 A1 | 4/2006 | Beukema et al. | |
| 2006/0168170 A1 * | 7/2006 | Korzeniowski | 709/223 |
| 2006/0206635 A1 | 9/2006 | Alexander et al. | |
| 2006/0248367 A1 | 11/2006 | Fischer et al. | |
| 2007/0055832 A1 | 3/2007 | Beat | |
| 2007/0094455 A1 * | 4/2007 | Butt et al. | 711/154 |
| 2007/0133536 A1 | 6/2007 | Kim et al. | |
| 2007/0168803 A1 | 7/2007 | Wang et al. | |
| 2007/0174529 A1 | 7/2007 | Rodriguez et al. | |
| 2007/0195774 A1 | 8/2007 | Sherman et al. | |
| 2008/0040634 A1 * | 2/2008 | Matsuzaki et al. | 714/47 |
| 2008/0114873 A1 * | 5/2008 | Chakravarty et al. | 709/224 |
| 2008/0147987 A1 | 6/2008 | Cantin et al. | |

OTHER PUBLICATIONS

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n.6, p. 49-58, Jun. 1990.

Michel, Dubois, Christoph Scheurich, Faye A. Briggs, Synchronization, Coherence, and Event Ordering in Multiprocessors, Computer, v.21 n.2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

\* cited by examiner

Figure 1: prior art

SHARED PERFORMANCE MONITOR IN A MULTIPROCESSOR SYSTEM

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract No. B548850 awarded by the Department of Energy.

CROSS-REFERENCE TO RELATED APPLICATIONS

The present invention is related to the following commonly-owned, United States Patent Applications filed on even date herewith, the entire contents and disclosure of each of which is expressly incorporated by reference herein as if fully set forth herein. U.S. patent application Ser. No. 11/768,645, now U.S. Pat. No. 7,886,084, for "OPTIMIZED COLLECTIVES USING A DMA ON A PARALLEL COMPUTER"; U.S. patent application Ser. No. 11/768,781, now U.S. Pat. No. 7,694,035 for "DMA SHARED BYTE COUNTERS IN A PARALLEL COMPUTER"; U.S. patent application Ser. No. 11/768,784, now U.S. Pat. No. 7,788,334, for "MULTIPLE NODE REMOTE MESSAGING"; U.S. patent application Ser. No. 11/768,697, now U.S. Pat. No. 8,103,832, for "A METHOD AND APPARATUS OF PREFETCHING STREAMS OF VARYING PREFETCH DEPTH"; U.S. patent application Ser. No. 11/768,532, now U.S. Pat. No. 7,877,551, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, now U.S. Pat. No. 7,827,391, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, now U.S. Pat. No. 7,669,012, for "INSERTION OF COHERENCE EVENTS INTO A MULTIPROCESSOR COHERENCE PROTOCOL"; U.S. patent application Ser. No. 11/768,791, now U.S. Pat. No. 8,140,925, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, now U.S. Pat. No. 7,802,025, for "DMA ENGINE FOR REPEATING COMMUNICATION PATTERNS"; U.S. patent application Ser. No. 11/768,799, now U.S. Pat. No. 7,680,971, for "METHOD AND APPARATUS FOR A CHOOSE-TWO MULTI-QUEUE ARBITER"; U.S. patent application Ser. No. 11/768,800 for "METHOD AND APPARATUS FOR EFFICIENTLY TRACKING QUEUE ENTRIES RELATIVE TO A TIMESTAMP"; U.S. patent application Ser. No. 11/768,572, now U.S. Pat. No. 7,701,846, for "BAD DATA PACKET CAPTURE DEVICE"; U.S. patent application Ser. No. 11/768,593 for "EXTENDED WRITE COMBINING USING A WRITE CONTINUATION HINT FLAG"; U.S. patent application Ser. No. 11/768,805, now U.S. Pat. No. 7,793,038, for "A SYSTEM AND METHOD FOR PROGRAMMABLE BANK SELECTION FOR BANKED MEMORY SUBSYSTEMS"; U.S. patent application Ser. No. 11/768,905, now U.S. Pat. No. 7,761,687, for "AN ULTRASCALABLE PETAFLOP PARALLEL SUPERCOMPUTER"; U.S. patent application Ser. No. 11/768,810, now U.S. Pat. No. 8,108,738, for "SDRAM DDR DATA EYE MONITOR METHOD AND APPARATUS"; U.S. patent application Ser. No. 11/768,812, now U.S. Pat. No. 7,797,503, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, now U.S. Pat. No. 8,010,875, for "ERROR CORRECTING CODE WITH CHIP KILL CAPABILITY AND POWER SAVING ENHANCEMENT"; U.S. patent application Ser. No. 11/768,552, now U.S. Pat. No. 7,873,843, for "STATIC POWER REDUCTION FOR MIDPOINT-TERMINATED BUSSES"; U.S. patent application Ser. No. 11/768,527 for "COMBINED GROUP ECC PROTECTION AND SUBGROUP PARITY PROTECTION"; U.S. patent application Ser. No. 11/768,669, now U.S. Pat. No. 7,984,448, for "A MECHANISM TO SUPPORT GENERIC COLLECTIVE COMMUNICATION ACROSS A VARIETY OF PROGRAMMING MODELS"; U.S. patent application Ser. No. 11/768,813, now U.S. Pat. No. 8,032,892, for "MESSAGE PASSING WITH A LIMITED NUMBER OF DMA BYTE COUNTERS"; U.S. patent application Ser. No. 11/768,619, now U.S. Pat. No. 7,738,443, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682 for "HARDWARE PACKET PACING USING A DMA IN A PARALLEL COMPUTER"; and U.S. patent application Ser. No. 11/768,752, now U.S. Pat. No. 8,001,401, for "POWER THROTTLING OF COLLECTIONS OF COMPUTING ELEMENTS".

BACKGROUND OF THE INVENTION

1. Field of the Invention

The present invention generally relates to computer systems using multiprocessor architectures and, more particularly, to a novel implementation of performance counters for recording occurrence of certain events.

2. Description of the Prior Art

Many processor architectures include on a chip a set of counters that allow counting processor events and system events on the chip, such as cache misses, pipeline stalls and floating point operations. This counter block is referred to as "performance counters".

Performance counters are used for monitoring system components such as processors, memory, and network I/O. Statistics of processor events can be collected in hardware with little or no overhead from operating system and application running on it, making these counters a powerful means to monitor an application and analyze its performance. Such counters do not require recompilation of applications.

Performance counters are important for evaluating performance of a computer system. This is particularly important for high-performance computing systems, such as Blue Gene/P, where performance tuning to achieve high efficiency on a highly parallel system is critical. Performance counters provide highly important feedback mechanism to the application tuning specialists.

Many processors available, such as UltraSPARC and Pentium provide performance counters. However, most traditional processors support a very limited number of counters. For example, Intel's X86 and IBM PowerPC implementations typically support 4 to 8 event counters. While typically each counter can be programmed to count specific event from the set of possible counter events, it is not possible to count more than N events simultaneously, where N is the number of counters physically implemented on the chip.

With the advent of chip multiprocessors systems, performance counter design faces new challenges. Some of the multiprocessor systems start from the existing uni-processor designs, and replicate them on a single chip. These designs typically inherit the design point of the processor's performance monitor unit. Thus, each processor has a small number of performance counters associated to it. Each performance unit has to be accessed independently, and counter events which can be counted simultaneously per processor can not exceed N, where N is the number of counters associated to the processor. Thus, even when the total number of performance counters on a chip M, where M=k×N, and k is the number of processors and N is the number of counters per processor, can be quite large, the number of events being counted per processor simultaneously can not exceed N, the number of counters associated per core.

An example of such design is Intel's dual-core Itanium 2 chip, which implements 2 processor cores. Performance counters in Intel's dual core Itanium-2 processor are implemented as two independent units, assigned each to a single processor. Each processor core has 12 performance counters associated to it, and each processor can use only its own 12 counters for counting its events.

FIG. 1 illustrates a typical prior art multiprocessor system 10 using the distributed performance monitor units. The multiprocessor system 10 includes a number of processors 20a, . . . , 20n, and each of the processors contains a performance monitor unit (PMU) 30a, . . . , 30n. Each of the performance monitor units can count a number of events N, where N is the number of counters implemented on that processor from much larger number of per-processor events L. The multi-processor system further includes one or more memory blocks 40a, . . . , 40m, and one or more network interfaces 50. Performance counters can not be shared between the processors, but instead, each PMU can count only events from the associated processor. For example, a processor 20b can not make use of performance counters 30a allocated to the processor 20a, even if the processor 20a does not need this resource.

While having distributed performance counters assigned to each processor is a simple solution, it makes programming the performance monitor units more complex. For example, getting a snapshot of an application performance at a certain point in time is complicated. To get accurate performance information for an application phase, all processors have to be stopped to read out the value of performance counters. To get performance information for all processors on the chip, multiple performance monitor units have to be accessed, counter values have to be read out, and this information has to be processed into single information. In addition, each counter unit has a plurality of processor events, from which a selected number of events is tracked at any time. In a multiple counter unit design, from each set of counter events a certain subset has to be selected. It is not possible to select more events from that group of events to count simultaneously by mapping these to other counter performance units. Such a design is less flexible in selecting a needed set of counter events, and to count a number of events from a single processor larger then number of implemented counters per processor, multiple application runs have to be performed.

It would be highly desirable to have a design of performance monitor unit in a multiprocessor environment which is easy to program and access, and which allows free allocation of counters between the number of processors. It would be highly desirable that such performance monitor unit allows assigning all performance counters available on a chip for counting processor events to a single processor to count large number of processor events simultaneously, or that such a design allows for flexible allocation of counters to processors as needed for individual performance tuning tasks optimally. This would allow more efficient usage of available resources, and simplify performance tuning by reducing cost.

In the prior art, the following patents address related subject matter to the present invention, as follows:

U.S. Pat. No. 5,615,135 describes implementation of a reconfigurable counter array. The counter array can be configured into counters of different sizes, and can be configured into groups of counters. This invention does not teach or suggest a system and method for using counters for performance monitoring in a multiprocessor environment.

U.S. Patent Application No. US 2005/0262333 A1 describes an implementation of branch prediction unit which uses array to store how many loop iterations each loop is going to be executed to improves branch prediction rate. It does not teach how to implement performance counters in a multiprocessor environment.

Having set forth the limitations of the prior art, it is clear that what is required is a system that allows flexible allocation of performance counters to processors on an as-needed basis, thus increasing the overall system resource utilization without limiting the system design options. While the herein disclosed invention teaches usage of a performance monitor unit which allows flexible allocation of performance counters between multiple processors on a single chip or in a system for counting the large number of individual events in a computer system, such as processors, memory system, and network I/Os, and is described as such in the preferred embodiment, the invention is not limited to that particular usage.

SUMMARY OF THE INVENTION

It is therefore an object of the present invention to provide a novel design of a performance counter unit that is shared between multiple processors or within a group of processors in a multiprocessor system. The invention teaches a unified counter unit for counting a number of events from multiple processors simultaneously.

In one embodiment, multiple processors provide performance monitoring events to the performance monitoring unit, and from this set of events, a subset of events is selected. The selection of events to count is flexible, and it can be from the set of events represented by event signals generated from a single processor, from several processors, or from all processors in a processor group or on a chip simultaneously. The selection of event signals to count is programmable, thus providing a flexible solution.

It is a further object of the present invention to provide a method and apparatus for flexible allocation of performance counters to processors in a multiprocessor system on an as-needed basis thus increasing the overall system resource utilization without limiting the system design options. This flexible method allows tracking of much larger number of events per a single processor in a multiprocessor system, or smaller number of events for all processors, simultaneously.

In accordance with one aspect of the invention, there is provided a performance monitoring unit (PMU) for monitoring performance of events occurring in a multiprocessor system, said multiprocessor system comprising a plurality of processor devices, each processor device for generating signals representing occurrences of events at said processor device, said PMU comprising:

a plurality of performance counters each for counting signals representing occurrences of events from one or more said plurality of processor units in said multiprocessor system;

a plurality of input devices for receiving said event signals from one or more processor devices of said plurality of processor units, said plurality of input devices programmable to select event signals for receipt by one or more of said plurality of performance counters for counting, wherein said PMU is shared between multiple processing units, or within a group of processors in said multiprocessing system.

In one embodiment of the invention, the PMU further comprising means for programmably selecting one or more of said plurality of input devices to allocate performance counters for simultaneously monitoring said event signals from said single, multiple or all processor devices.

In one additional embodiment of the invention, the means for programmably selecting one or more of said plurality of input devices comprises one or more programmable counter configuration registers adapted for configuring select input devices to receive certain event signals from certain processor devices in said multiprocessor system.

In an additional embodiment, the performance monitoring unit further comprises means accessible by said one or more said processor devices for reading a count value from one or more of said plurality of performance counters, and, for writing a value to one or more of said plurality of performance counters.

In accordance with another aspect of the invention, there is provided a multiprocessor system having two or more functional groups of processor units, each functional group including a plurality of processor devices, said system comprising:

an individual performance monitor unit (PMU) associated with a respective group of the two or more groups of processor units, each PMU having:

a plurality of performance counters each for counting signals representing occurrences of events from one or more plurality of processor units in a group;

a plurality of input devices programmable for receiving the event signals from one or more processor devices of the group, the plurality of input devices programmable to select event signals for receipt by one or more of the plurality of performance counters for monitoring the events, wherein the PMU is shared for tracking event signals from processors included in its functional group in the multiprocessing system In accordance with this another aspect of the invention, the PM further comprises:

a means for programmably selecting one or more of said plurality of input devices to allocate performance counters for simultaneously monitoring said event signals from said single, multiple or all processor devices of a functional group, wherein a respective PMU is shared for tracking event signals only from its dedicated functional group.

Further, in accordance with this another aspect of the invention, the multiprocessor system further includes:

a plurality of functional groups of non-processor units, each group of non-processor units comprising a plurality of non-processor devices, said system further comprising:

an individual performance monitor unit (PMU) associated with a respective functional group of said non-processor units, wherein said PMU associated with a respective functional group of said non-processor units is shared for tracking event signals from said non-processor devices included in its functional group.

In further accordance with this another aspect of the invention, an individual performance monitor unit (PMU) associated with a respective functional group is further adapted for monitoring event signals from processor devices or non-processor devices sourced from another functional group.

In a further embodiment of the invention, there is provided a central performance monitor unit for providing configuration information for programmably configuring a respective performance monitor unit in one or more functional groups to simultaneously monitor said event signals from processor or non-processor devices in said multiprocessor system in a same or different functional group.

In accordance with yet another aspect of the invention, there is provided a method for monitoring event signals from one or more processor or non-processor devices in a multiprocessor system, each processor and non-processor device for generating signals representing occurrences of events at said processor or non-processor device, said method comprising:

providing an individual performance monitor unit (PMU) for monitoring performance of events occurring in a multiprocessor system;

providing, in said PMU, a plurality of performance counters each for counting signals representing occurrences of events from one or more said plurality of processor or non-processor devices in said multiprocessor system; and, providing, in said PMU, a plurality of input devices for receiving said event signals from one or more processor devices of said plurality of processor units; and, programming one or more of said plurality of input devices to select event signals for receipt by one or more of said plurality of performance counters for counting, wherein said PMU is shared between multiple processor or non-processor devices, or within a respective group of processor or non-processor devices in said multiprocessing system.

Further to this yet another aspect of the invention, said programming one or more of said plurality of input devices comprises implementing logic at said PMU for:

identifying a type of current event signal received from a processor or non-processor device;

determining if a performance counter is configured for receiving said received event signal; and, if a performance counter is configured for receiving said current event signal;

identifying a processor core generating said current of event signal; and, determining if a performance counter is configured for receiving said current event signal from said identified processor core.

Still further to this yet another aspect of the invention, programming one or more of said plurality of input devices comprises implementing logic for:

determining if a performance counter is associated with a current event signal received;

identifying one or more counters associated with the current event; and, determining if the identified one or more counters is associated with the current event type and a current processing core; and, identifying the one or more counters that is associated with the current processor core and with the current event type.

In one advantageous use of the present invention, performance counters of a PMU provide highly important feedback mechanism to the application tuning specialists. That is, event statistics is used to tune applications to increase application performance and ultimately, system performance. This is particularly important for high-performance computing systems, where applications are carefully tuned to achieve high efficiency on a highly parallel multiprocessor system.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
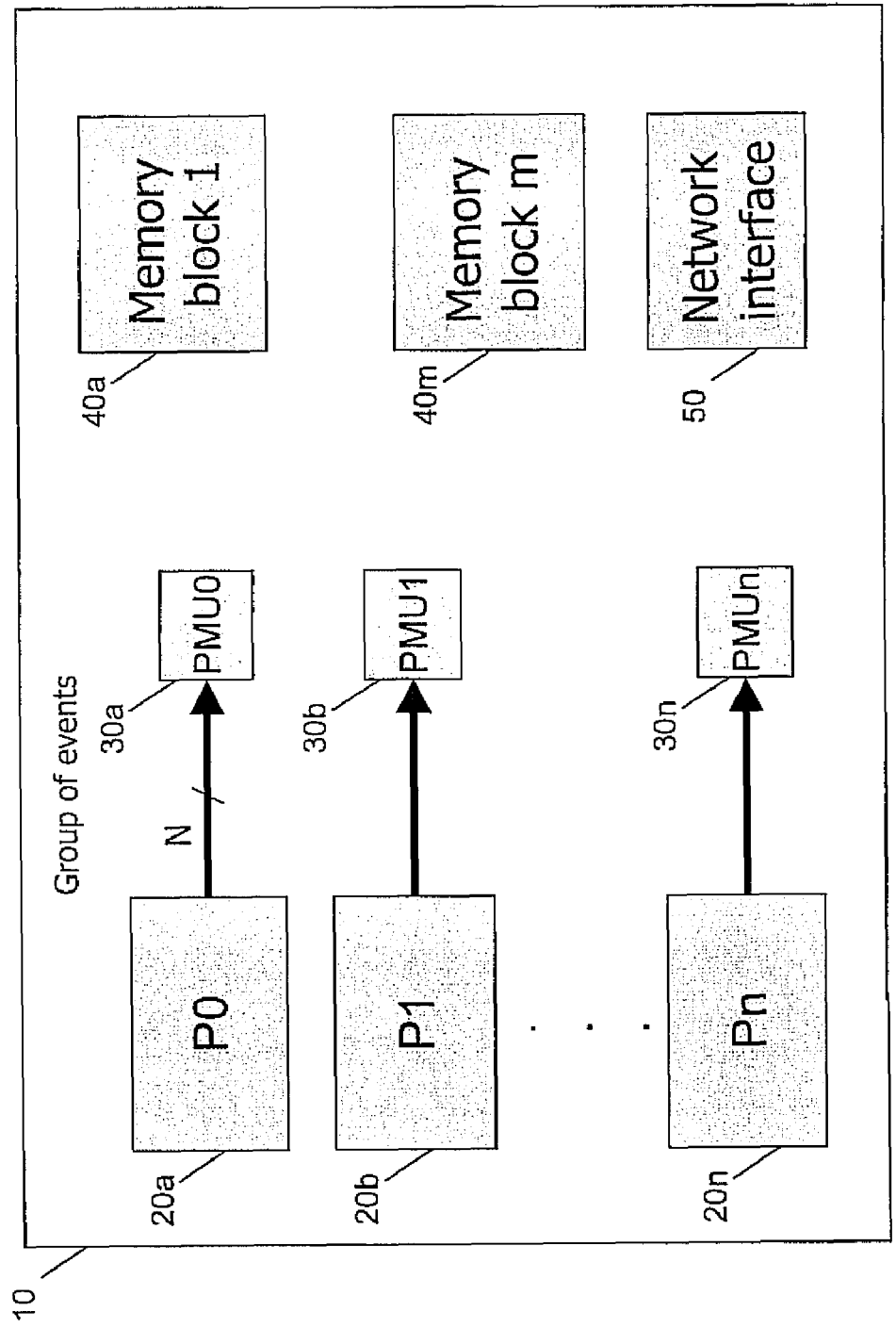
FIG. 1 depicts prior art, a typical performance counters design in a multiprocessor system.
Figure 2:
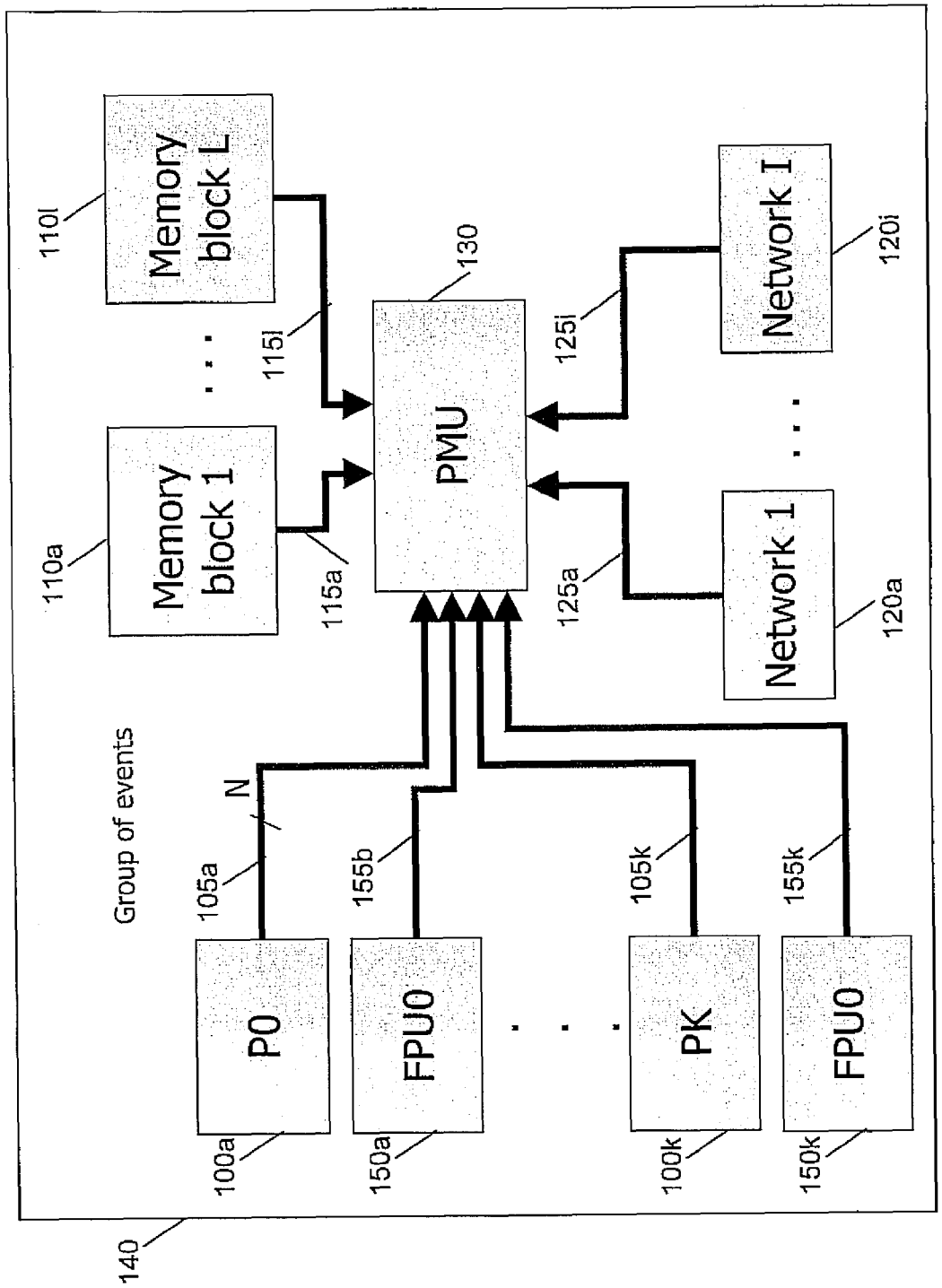
FIG. 2 depicts a preferred embodiment of the invention, with a unified performance counter unit shared between multiple processors and memory and network system.

Referring now to drawings, and more particularly to FIG. 2, there is shown the preferred embodiment of the invention. The multiprocessor system 140 includes a number "K" of processor units 100a, ..., 100k each with their adjoin floating point units 150a, ..., 150k, "L" memory blocks 110a, ..., 110l, "I" network blocks 120a, ..., 120i, and a unified performance monitor unit (PMU) 130 with performance counters. Each processor unit 100a, ..., 100k and their adjoin floating point unit 150a, ..., 150k, each memory block 110a, ..., 110l and each network block 120a, ..., 120i is physically connected to the PMU 130 via one or more conductive signal lines, e.g., a single or multiple conductive lines, or a data bus having multiple signal lines, or, in one embodiment, a parallel data bus of N-bits wide, for sending up to "N" events simultaneously from a respective processor unit to the PMU. For example, from each processor unit 100a, ..., 100k, a respective data bus 105a, ..., 105k is connected to the performance monitor unit 130 for counting up to Np counter events. Likewise, from each floating point processor unit 150a, ..., 150k, respective signal lines 155a, ..., 155k are connected to the performance monitor unit 130 for counting up to Nf counter events. Likewise, from each memory block 110a, ..., 110l, respective signal lines 115a, ..., 151l are connected to the performance monitor unit 130 for counting up to Nm counter events; and, from each network block 120a, ..., 120i, respective signal lines 125a, ..., 125i are also connected to the performance monitor unit 130 for counting up to Nn counter events. Thus, in the preferred embodiment, the performance monitor unit 130 is shared between a number of processors and non-processor units, e.g., floating-point units, the memory storage devices and network devices. In the preferred embodiment, electronic signals representing events from the multitude of processors and floating point units, from the multitude of memory blocks, and from the multitude of network blocks are forwarded on the conductive signal lines from the various units and connected to the performance monitor unit 130.

It would be understood by one skilled in the art that other embodiments are also possible: connecting only multitude of processors 100a, ..., 100k to the PMU 130 without any connection from other blocks in the system, or connecting counter events from the multitude of processors and counter events from one or more non-processor blocks in the system to the performance monitor unit 130 without departing from the scope of this invention. The non-processor blocks providing counter events can be, in addition to said network, memory and floating point blocks, blocks for vector computation, or some other specialized computation, blocks for system initialization and testing, blocks for temperature, voltage or some other environmental monitoring, or some other control system, as it is obvious to anybody skilled in the art.

Figure 3:
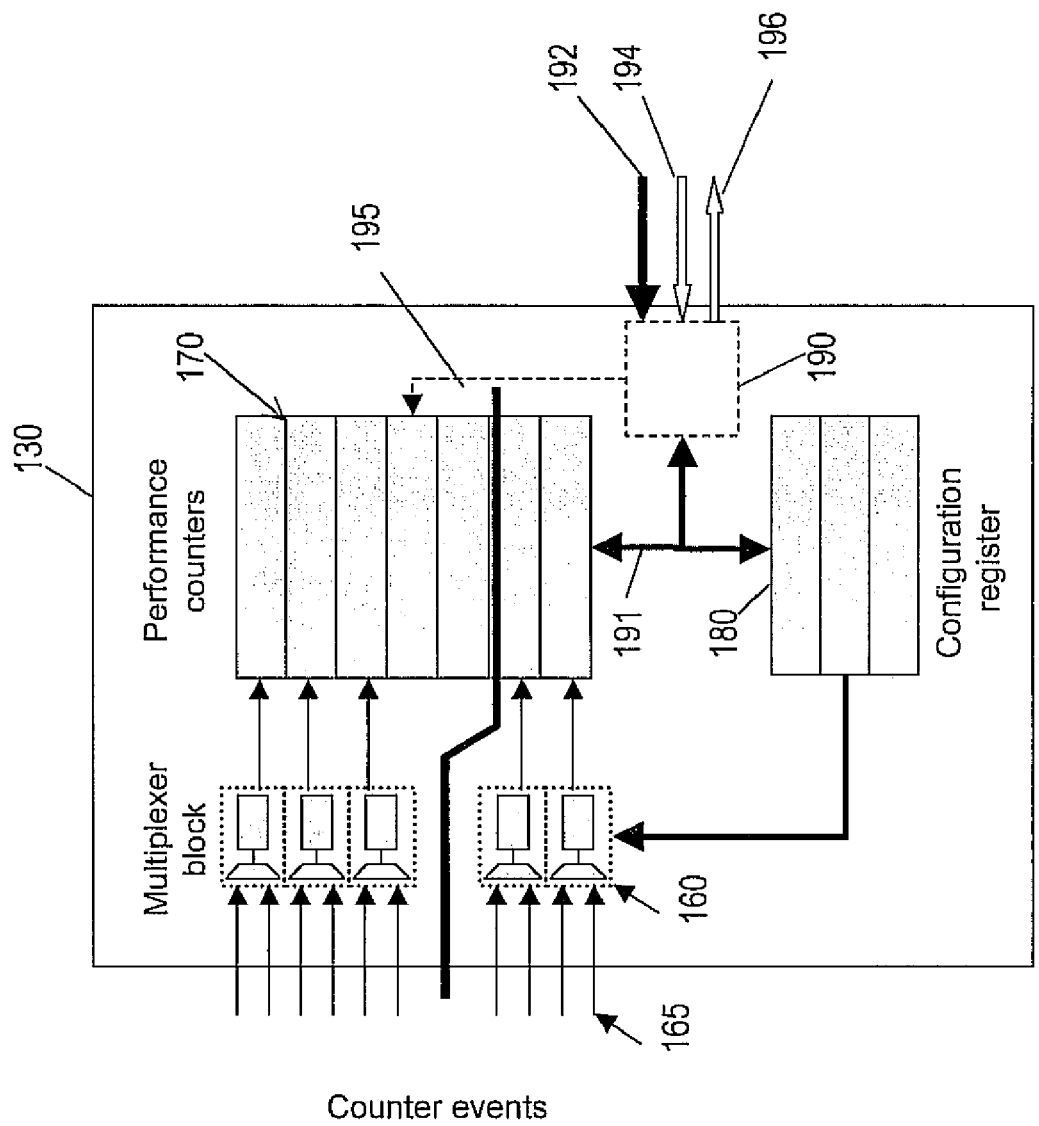
FIG. 3 depicts a high level schematic of a performance counter unit in accordance with a preferred embodiment of the invention.

Referring now to FIG. 3, depicted is a block diagram of components of the performance counter unit 130. The performance counter unit 130 contains M performance counters 170, set of multiplexers for counter event selection 160, and one or more configuration registers 180 for programmable selection of counter events. PMU 130 receives a number of counter events from all its sources. From the set of all counter events CE=Np×K+Nf×K+Nm×L+Nn×I, labeled 165 in FIG. 3, M counter events to monitor by said M counters 170 are selected by said set of multiplexers 160.

In one embodiment, the selection of events to monitor is performed at the PMU itself which is programmed to configure the input devices, e.g., multiplexers or like logic gated inputs, and/or configure the parallel performance counters for receiving certain event signal types from certain processing cores. In one embodiment, the performance monitor unit may comprise the hybrid performance monitoring unit such as described in U.S. patent application Ser. No. 11/507,307 entitled METHOD AND APPARATUS FOR EFFICIENT PERFORMANCE MONITORING OF A LARGE NUMBER OF SIMULTANEOUS EVENTS, now U.S. Pat. No. 7,461,383, the whole contents and disclosure of which is incorporated by reference as if fully set forth herein.

In the preferred embodiment, from the set of M counters, all M counters can be used for counting processor events, or any other counter events from the system.

In yet another embodiment, only a subset of Mp counters can be used to count processor events and floating-point units.

In yet another embodiment, Mp counters for counting processor events are implemented in a different way than the remaining M−Mp performance counters. One possible implementation for processor performance counters is to allow counting of events from processors and floating point units that are operated on higher frequencies then the rest of the elements in a multiprocessor system. For example, only Mp performance counters can count events changing at a higher operating frequency, while the remaining M−Mp counters can count only events changing at a lower operating frequency, thus reducing power consumption, and allowing for simpler design.

In yet another embodiment, Mp counters for counting processor events are implemented in the same way as the remaining M−Mp performance counters. For example, all performance counters count events changing at the same operating frequency.

Referring back to FIG. 2 the preferred embodiment allows flexible selection of M counter events to monitor. A multitude of different configurations are possible. One configuration is that PMU 130 monitors up to Nmax events from any single processor simultaneously, where Nmax is limited by the number of counters M in the PMU, or number of counters Mp allocated for processor events, or number of performance monitor events per processor Np, whichever is smallest: Nmax=min(M, Mp, Np). Another configuration is that PMU 130 monitors events from two or more processors simultaneously, distributing performance counters between the participating processors in some way. Yet another configuration is that PMU 130 monitors counters events from all processors simultaneously. One possible configuration when monitoring counter events from all processors is to distribute Mp counters between the all processors evenly. When K×Np≦Mp, one possible configuration is that all Np processor events from all K processors are monitored simultaneously.

In the preferred embodiment, the processor monitor unit 130 can be accessed from all processors. The multitude of processors 100a, . . . , 100k has access to the processor monitor unit 130 to read out the value of the M performance counters 170. In the preferred embodiment, the multitude of processors 100a, . . . , 100k has access to the performance monitor unit 130 to write and/or clear performance counters 170. In the preferred embodiment, the set of multiplexers 160 to select inputs to M performance counters 170 from the set of all counter events 165 are configured depending on the value written in one or more counter configuration register block 180 which is located in the performance monitor unit PMU 130. The multitude of processors 100a, . . . , 100k has access to performance monitor unit 130 to write to the configuration registers 180 to specify configuration of multiplexers 160 for counter event selection.

In yet another embodiment only one processor from the multitude of processors has an access to the performance monitor unit 130 to read and/or write performance counters 170.

In yet another embodiment, only a subset of processors from the multitude of processors has an access to the performance monitor unit 130 to read and/or write performance counters 170.

In yet another embodiment, only one processor from the multitude of processors has an access to the performance monitor unit 130 to write counter configuration registers 180.

In yet another embodiment, only a subset of processors from the multitude of processors has an access to the performance monitor unit 130 to write counter configuration registers 180.

To write to or retrieve a value from any of the performance counters 170 the processor accesses circuitry provided in the PMU for performing the write or read transaction. For example, FIG. 3 depicts extra circuitry 190 and address/data signal and control lines 191-196 that may be required for enabling read/write access to the performance counters 170 and, similarly, for enabling read/write access to counter configuration registers 180. In such an embodiment, circuitry 190 may receive an address via address lines 192 from a processor, and implement address decode and control logic for generating control signals (such as a "write" signal (not shown) and "Select" signal 195 to write a data word into a performance counter, the data to be written being received from a data bus via a data bus port 194. Similarly, circuitry 190 may receive an address via address lines 192 from a processor, and implement address decode and control logic for generating control signals (such as a "read" signal (not shown) and "Select" signal 195) to read a data word from a performance counter, the data to be read being output to a data bus via a data bus port 196.

Depending upon the implementation of the PMU and particularly, the width (in bits) of the counter, this write access may be performed in one or two write bus transactions. In the example implementation of a PMU as described in above-referenced, commonly-owned, U.S. patent application Ser. No. 11/507,307, now U.S. Pat. No. 7,461,383, incorporated by reference herein, the performance monitor unit 170 is a hybrid performance monitoring unit requiring an assembly of a least significant part of the counter stored in discrete registers, and a more significant part of the counter stored in a counter memory array. Only after both parts of the counter have been retrieved, a counter value can be returned to the requesting processor. Similarly, on a counter write, the written data are split into two parts: the least significant part to be stored in the discrete registers of the counter, and the most significant part of the counter value to be stored in the memory array.

In yet another embodiment of the invention, counter configuration registers 180 are not located within the performance monitor unit 130, but are located within one or more other units.

In another embodiment, all performance counters in the system are contained in the performance monitor unit.

In yet another embodiment, the multitude of processors in a multiprocessor system include one or more local performance counters within a processor, in addition to performance counters located in the performance counter unit. The local counters in this embodiment are used only by the local processor. The unified performance monitor unit is shared amongst the processors as described in this invention.

Figure 4:
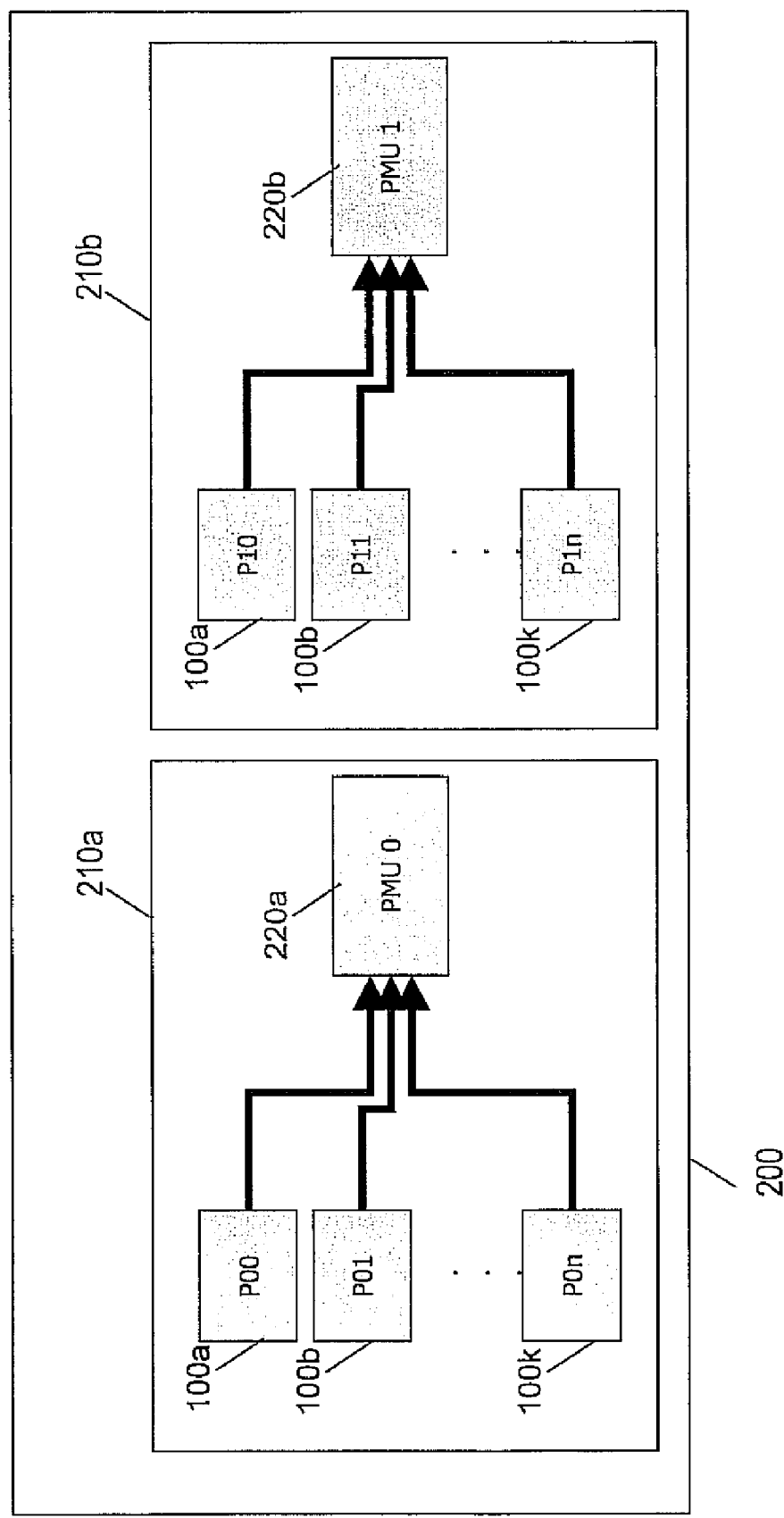
FIG. 4 depicts an alternative embodiment of the invention, where processors in a multiprocessor system are split into several groups, each group sharing a single performance counter unit.

Referring now to FIG. 4, depicted is alternative embodiment of the invention. The multiprocessor system 200 contains two groups of processor units, 210a, 210b, each group of processor units 210 containing a multitude of processor units 100a, . . . , 100k, and a unified performance monitor unit (PMU) 220 with performance counters for that processor group. The group unified performance monitor unit 220 tracks only events from that processor group. Performance events from the processor units in the group 210a are counted only with the performance monitor unit 220a, and performance events from the processor units in the group 210b are counted only with the performance monitor unit 220b. In one embodiment, the number or processor units in the processor group is the same. In another embodiment, the number of processor units in the processor groups is different.

Figure 5:
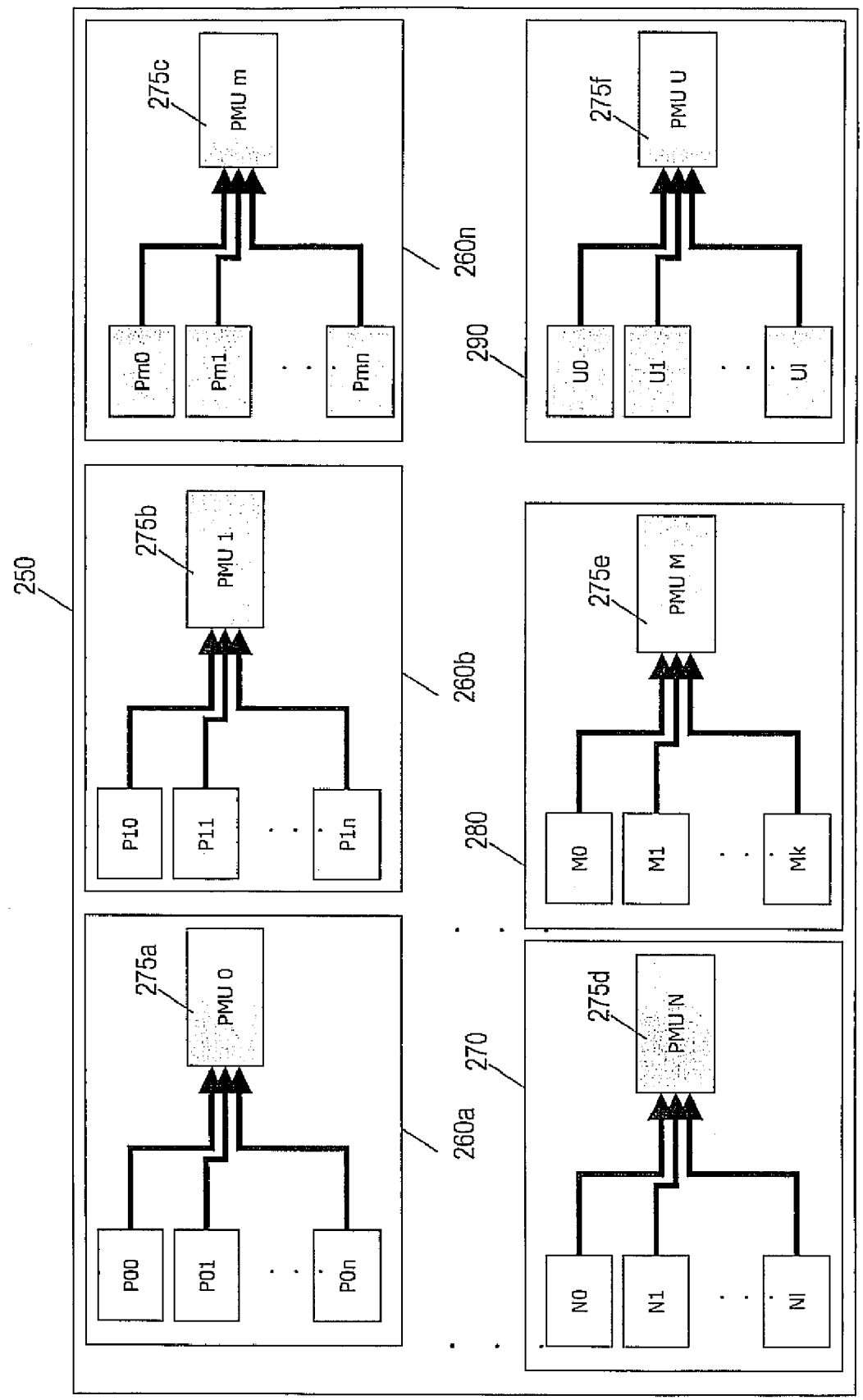
FIG. 5 depicts an alternative embodiment of the invention, with several groups of multiple processors, and with network block group and memory block group, each group sharing a single performance counter unit.

Referring now to FIG. 5, depicted is an alternative embodiment of the invention. The multiprocessor system 250 contains multiple groups of processor units 260a, . . . 260n, one or more network groups 270, one or more memory groups 280, and one or more non-processor units groups 290, where said non-processor units can be, in addition to said network and memory blocks, blocks for floating point computation, vector computation, or some other specialized computation, blocks for system initialization and testing, blocks for temperature, voltage or some other environment monitoring, or some other control system, as it is obvious to ones skilled in the art.

In accordance with present invention, each said group of processor, or non-processor units has a performance monitor unit 275a, ..., 275f, shared only between the units in that functional group, counting only performance events generated within that unit group.

It is to be understood that the number and type of units in a functional group can vary. For example, a group can contain both processor and non-processor elements.

It is further understood that other configurations are possible, e.g., different functional unit groups can contain the same or different number of all processor or all non-processor elements, or different functional unit groups can contain the same or different number of some combination of processor and non-processor functional units.

Figure 5A:
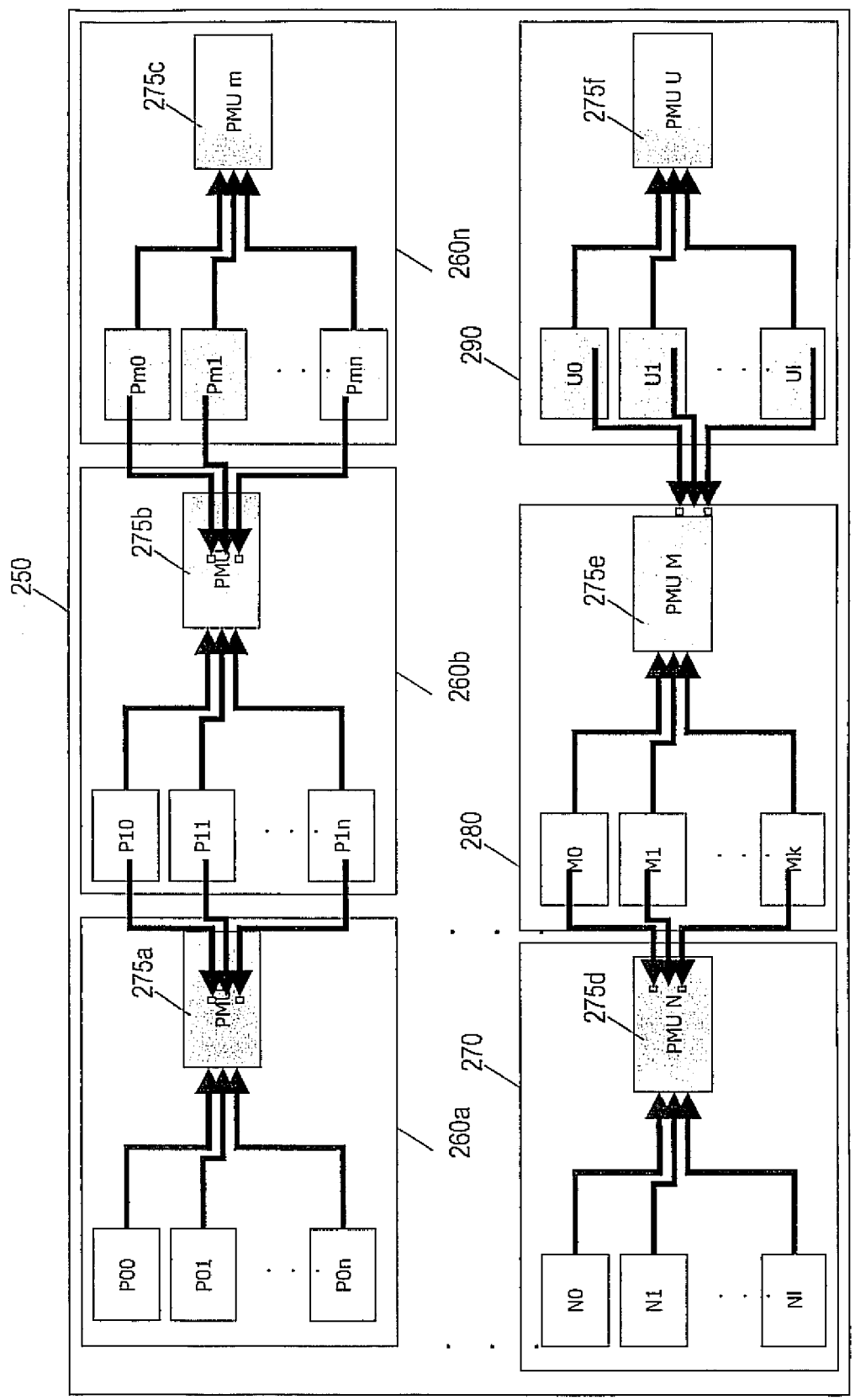
FIG. 5A depicts an alternative embodiment of the invention, where counter events from a cluster of cores can be connected to more than one PMU.

FIG. 5A, thus describes an alternative embodiment, where counter events from a cluster of cores can be connected to more than one PMU. For example, as shown in FIG. 5A, each group of processor units 260a, ..., 260n, 270, 280 and 290 has access to the respective performance monitor units $PMU_0$-$PMU_U$ 275a-275f, respectively associated with each group. However, in addition, as shown in FIG. 5A, events from each group of processor units, e.g., processors P10, ..., P1N in functional group 260b, will not only be monitored by its dedicated PMU, e.g., PMU 275b for functional group 260b in FIG. 5A, but can additionally be monitored by another PMU, e.g., PMU 275a for functional group 260a in FIG. 5A. Similarly, events from each group of non-processor units, e.g., memory groups M0, ..., Mk in functional group 280, will not only be monitored by its dedicated PMU, e.g., PMU 275e for functional group 280, but will additionally be monitored by another PMU, e.g., PMU 275d corresponding to functional network group 270 in FIG. 5A. The advantage of this approach is greater flexibility, and better event balancing and tracking.

Figure 6:
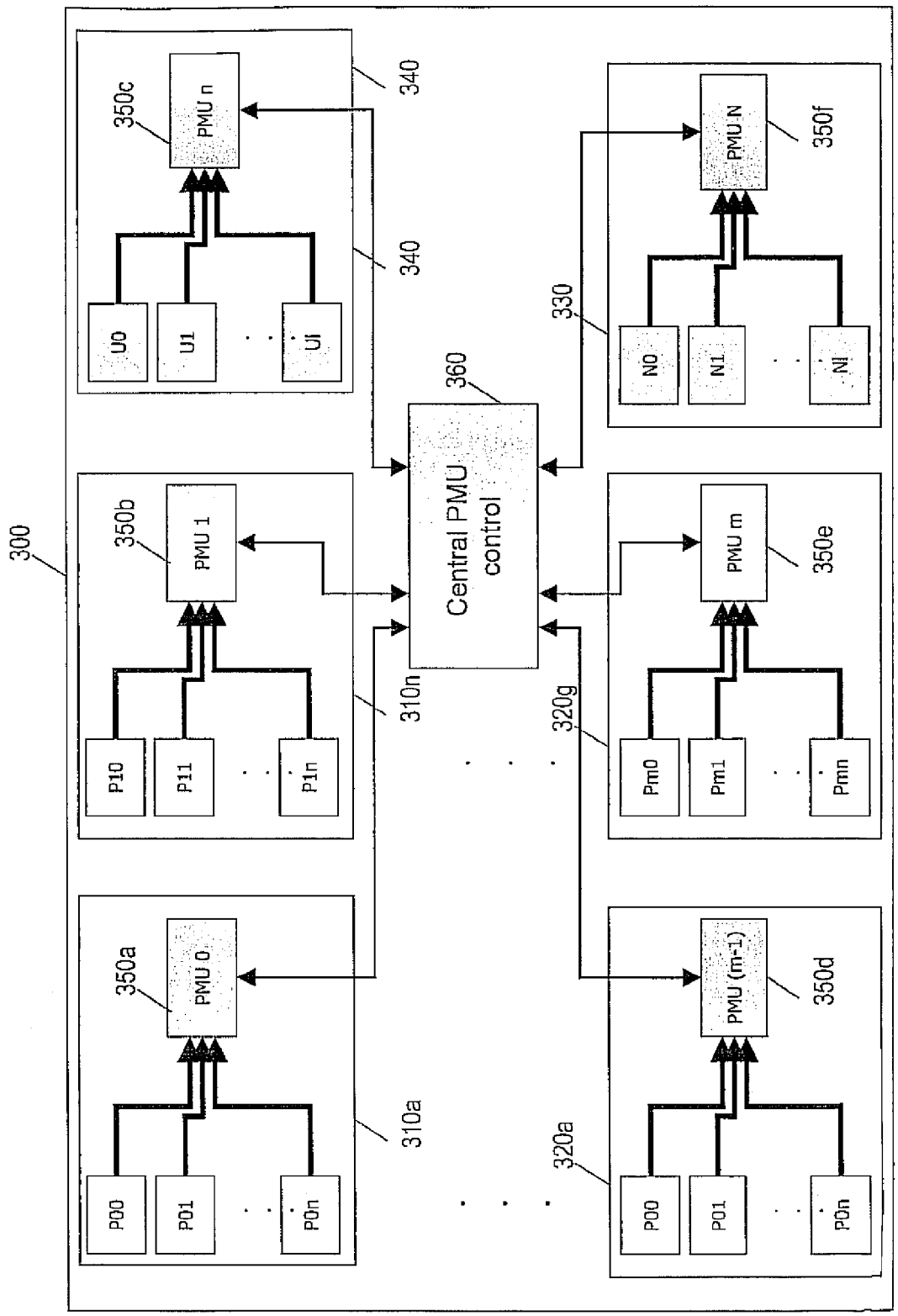
FIG. 6 is depicts an alternative embodiment of the invention, with several groups of processors and non-processor units, each group sharing a single performance counter unit, and with a central PM control unit.

Referring now to FIG. 6, depicted is an alternative embodiment of the invention. The multiprocessor system 300 contains multiple groups of processor units 310a, ..., 310n, one or more network groups 330, one or more memory groups 320a,g, and one or more non-processor units groups 340, where said non-processor units can be, in addition to said network and memory blocks, blocks for floating point computation, vector computation, or some other specialized computation, blocks for system initialization and testing, blocks for temperature, voltage or some other environment monitoring, or some other control system, as it is obvious to anybody skilled in the art.

In accordance with present invention, each said group of processor, or non-processor units has a performance monitor unit 350a, ..., 350f, shared only between the units in that functional group. In addition to the group performance monitor units 350a, ..., 350f there is a central performance monitor control unit 360. The central PM control unit 360 contains control or configuration information for programming each performance monitor unit 350a, ..., 350f of each group. In another embodiment, the central PMU control unit 360 is capable of accessing counter values information from all group PMUs. In yet another embodiment, the central PMU control unit 360 can be accessed by only one, or some set of processors located in the computer system. In yet another embodiment, the central PMU control unit 360 can be accessed by all processors located in the computer system.

Figure 7:
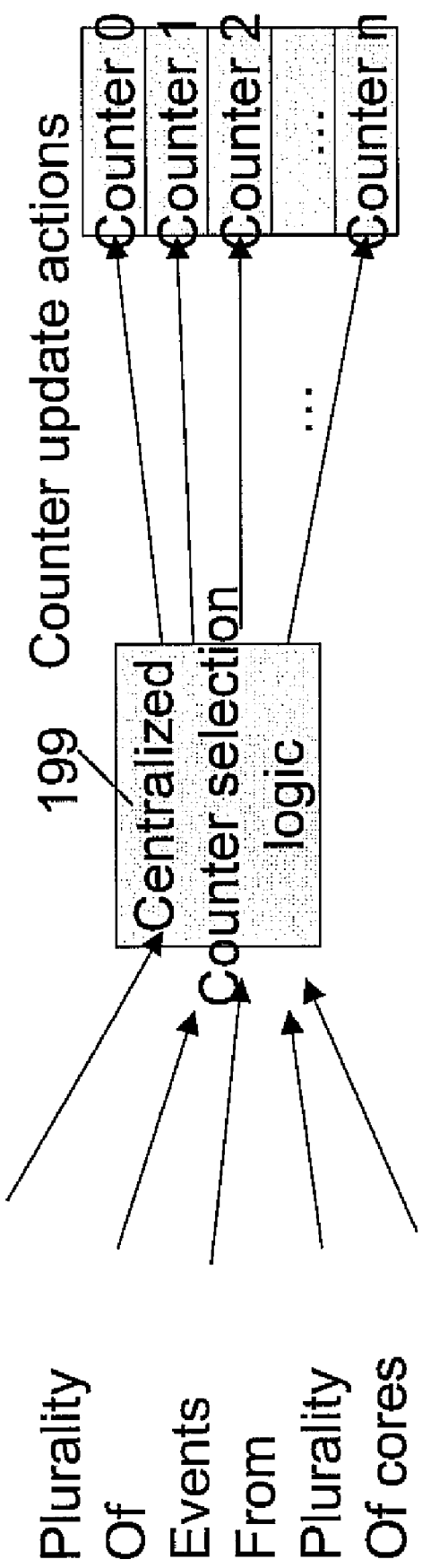
FIG. 7 depicts conceptually, the one aspect of controlling the application of performance counters in the PMU the present invention.

FIG. 7 depicts conceptually, the one aspect of controlling the application of performance counters in the PMU according to the present invention. As shown in FIG. 7, local event selection logic 199 may be implemented either inside or outside of the PMU, to select counter events to be tracked. From all counter events received to the event selection logic 199, a subset of counter events is selected and forwarded to the PMU. This design has an advantage of reducing the number of signals which has to be driven from the multitude of processors to the PMU.

Figure 8:
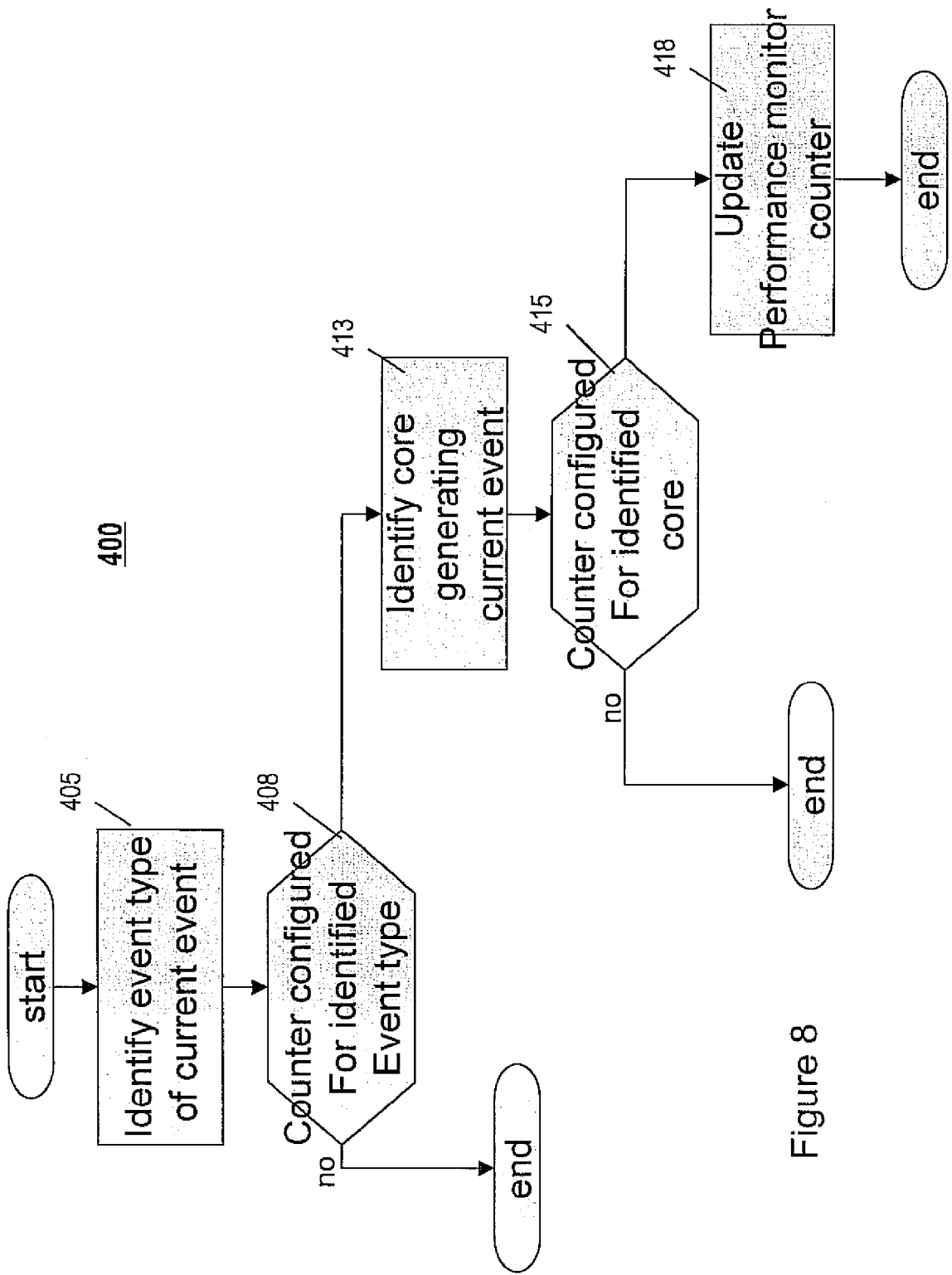
FIG. 8 depicts a counter selection algorithm implemented by selection logic, shown in FIG. 3, implemented in parallel at each of the performance monitors counter devices.

FIG. 8 depicts a counter selection algorithm 400 implemented by selection logic 160, shown in FIG. 3, implemented in parallel at each of the performance monitor counter devices 170. For example, logic steps programmed at the input device (e.g., multiplexors) may be performed including: identifying the event type of the current event (step 405); determining if the counter is configured for the identified event type (step 408) and, ending if no counter is configured to receive the event type; identifying the core that generated the current event (step 413); and determining if the counter is configured for the identified core (step 415) and, ending if no counter is configured for the identified core; and if a counter is configured for the event and core updating that performance counter (step 418).

Figure 9:
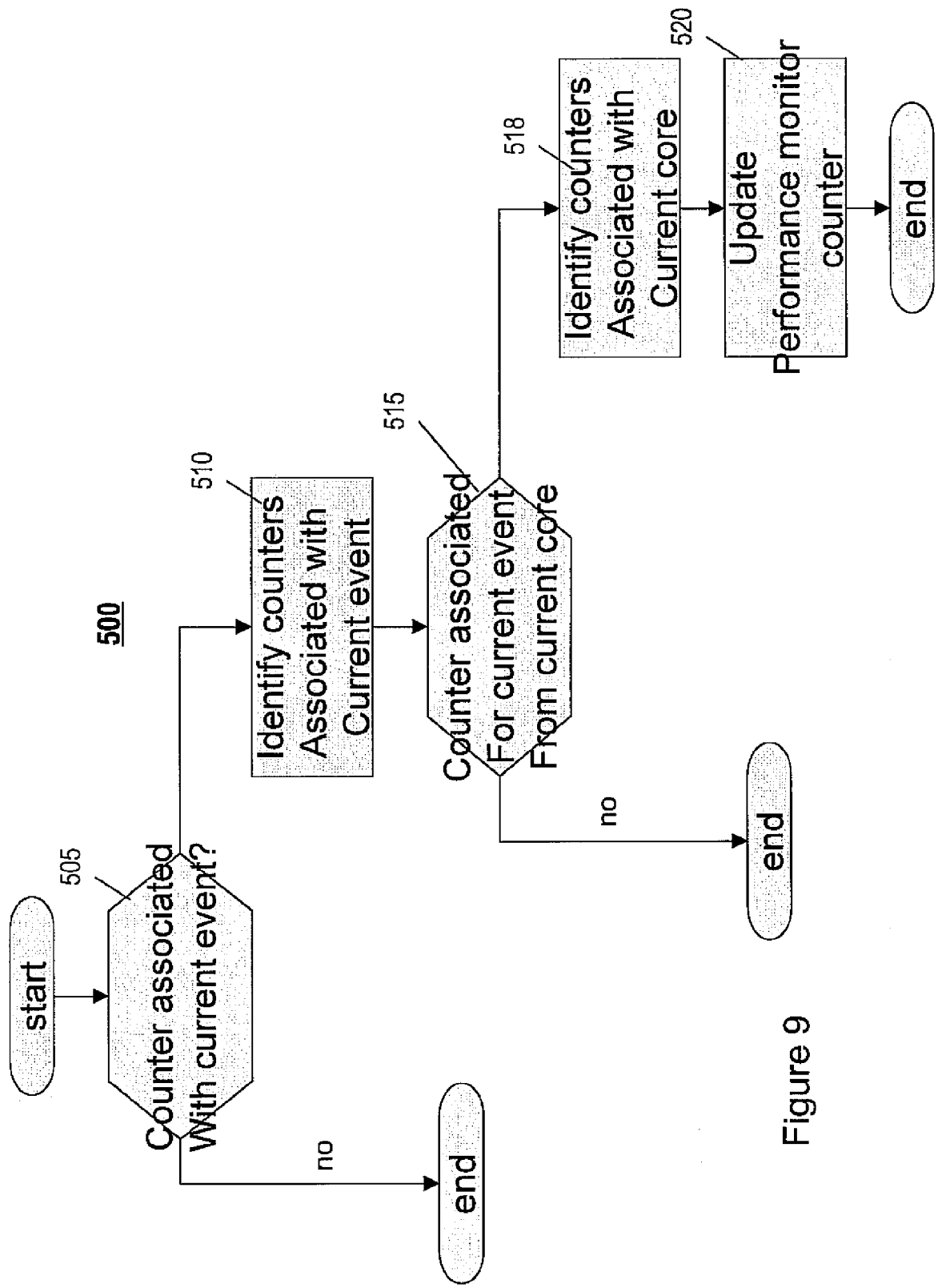
FIG. 9 depicts an alternate embodiment of a centralized counter selection algorithm that implements event-based selection, as governed by selection logic 199 of FIG. 7.
Figure 10:
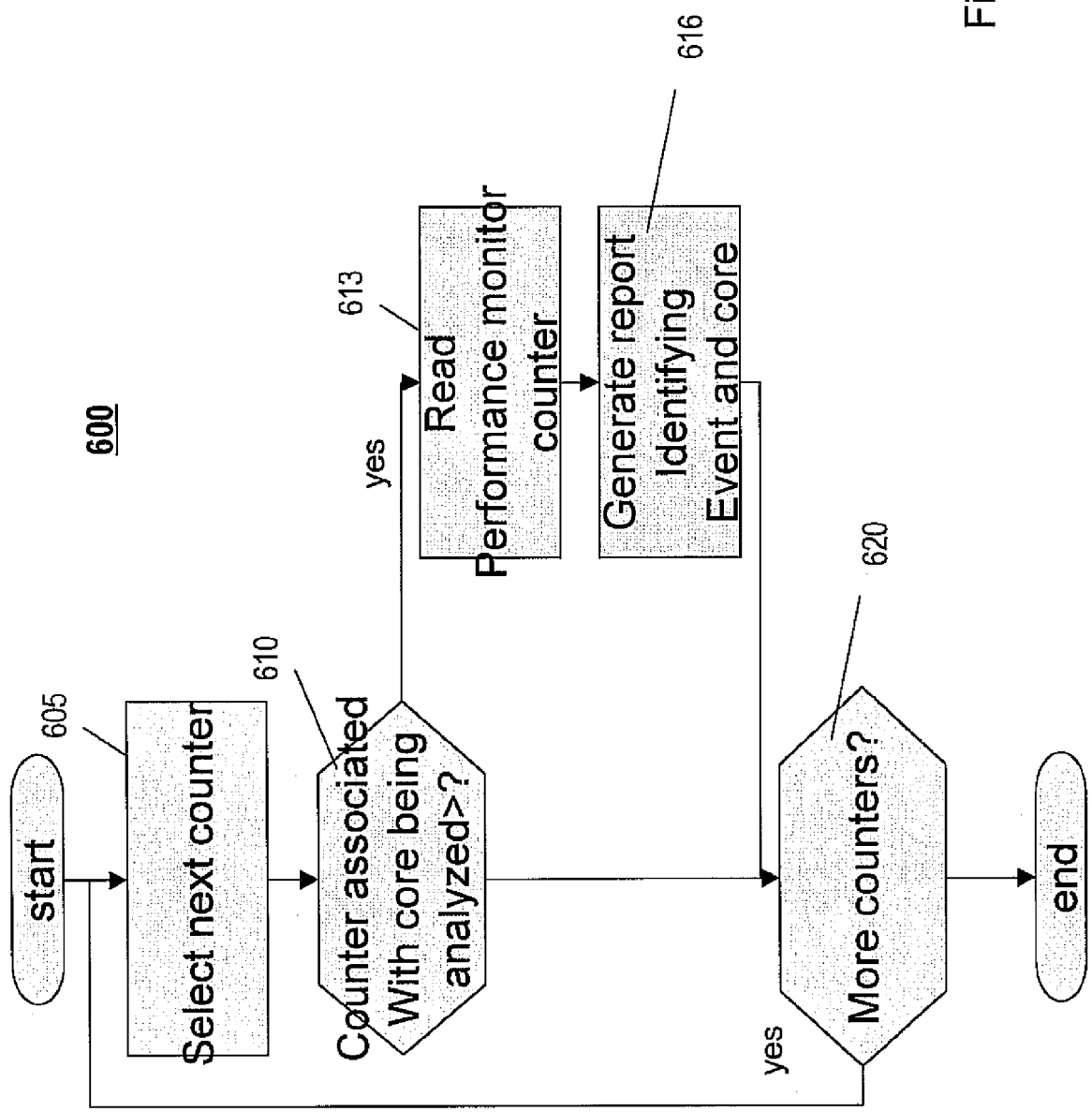
FIG. 10 depicts the processing steps 600 implemented for reading performance monitor count values associated with receipt of events for a particular processor core; and, FIG. 11 depicts one example embodiment of a design process 700 for connecting a PMU to event types.

FIG. 9 depicts an alternate embodiment of a centralized counter selection algorithm 500 that implements event-based selection, as governed by selection logic 199 of FIG. 7. For example, in the approach depicted in FIG. 9, logic steps may be performed including: determining if a counter is associated with a current event signal received (step 505) and, ending if no counter is associated with a received event type; identifying the counter associated with the current event (step 510); and, determining if a counter is associated with the current event and the current processor core (step 515), or, ending if there is no counter associated with the current event and the current processor core; and otherwise, identifying that counter that is associated with the current processor core and with the current event type (step 518); and updating that performance counter (step 520). FIG. 10 depicts the processing steps 600 implemented for reading performance monitor count values associated with a particular processor core. For example, in the approach depicted in FIG. 10, logic steps may be performed including: selecting a particular performance counter (step 605) of a plurality of counters; determining if the counter is associated with the core being analyzed (step 610), and, if so, reading out the performance counter value (step 613) and, generating a report identifying the event and the core (step 616) before executing step 620 which determines if there are more performance counters to be analyzed. Otherwise, if at step 610, it is determined that the particular monitor device is not associated with the core being analyzed, then the process will continue to step 620. At step 620, if it is determined that there are no more performance counters to analyze, the process will end. However, if it is determined that there are more performance counters to analyze at step 620, the process returns to step 605 which selects the next performance counter of the plurality and the steps 610-620 are repeated until there are no more counters. It is understood that the method executed during performance monitor read-out may be performed, e.g., by a performance monitoring tool extended to support CMP clustered counters in accordance with the present invention.

Figure 11:
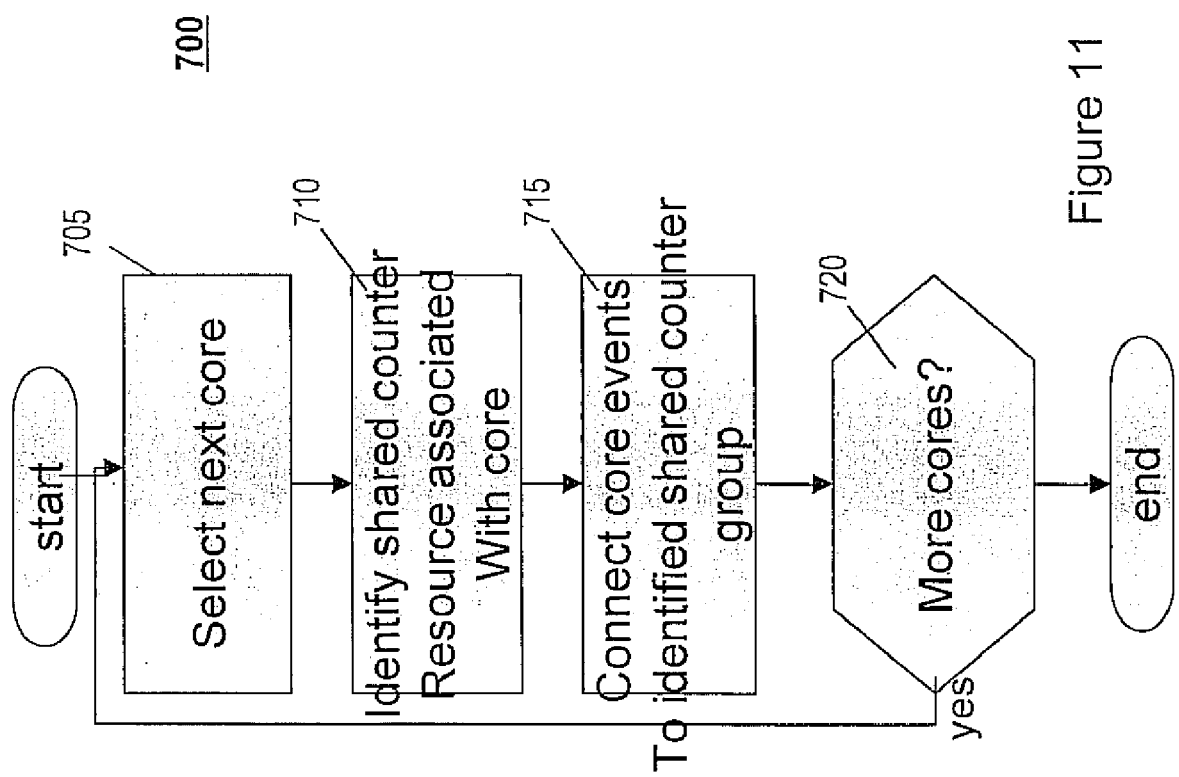

FIG. 11 depicts one example embodiment of a design process 700 for connecting a PMU to event types. This design method is implemented to design and configure systems including, but not limited to, those shown in FIGS. 2-6, as described herein. For example, in the design approach depicted in FIG. 11, logic steps may be performed including: selecting a particular performance core (step 705); identifying a shared counter resource associated with that selected core (step 710); connecting core events to an identified shared counter resource or group (step 715); and, determining if there are more cores to be connected (step 720). If at step 720, it is determined that there are no more cores to connect, the process will end. However, if it is determined that there are more performance counters to connect at step 720, the process returns to step 705 which selects the next core of the plurality of cores and the steps 710-720 are repeated until there are no more cores to connect.

Via this design methodology, a single shared counter resource may be shared by all cores. In another embodiment, multiple shared counter resources are available, and each core is connected to one resource. In yet another embodiment, multiple shared counter resources are available, and each core is connected to multiple counter resources.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

Having thus described our invention, what we claim as new, and desire to secure by Letters Patent is:

1. A system including at least a first performance monitoring unit (PMU) and a second performance monitoring unit (PMU) for monitoring performance of events occurring in a multiprocessor system, said multiprocessor system comprising a plurality of processor units, each processor unit for generating signals representing occurrences of events at said processor unit, each processor unit being associated with a single one of a plurality of functional groups, said system comprising:
   a first plurality of performance counters, each performance counter of the first plurality of performance counters for counting signals representing occurrences of events from one or more processor units associated with only a first one of the functional groups;
   a first plurality of input devices, each input device of the first plurality of input devices for receiving said event signals from one or more processor units associated with the first functional group, said first plurality of input devices programmable to select event signals for receipt by one or more of said first plurality of performance counters for counting;
   a second plurality of performance counters, each performance counter of the second plurality of performance counters for counting signals representing occurrences of events from one or more processor units associated with only a second one of the functional groups; and
   a second plurality of input devices, each input device of the second plurality of input devices for receiving said event signals from one or more processor units associated with the second functional group, said second plurality of input devices programmable to select event signals for receipt by one or more of said second plurality of performance counters for counting;
   wherein each PMU is shared between said plurality of processor units;
   wherein said first PMU further comprises a first programmable selector configured to programmably select one or more of said plurality of first input devices to allocate performance counters for monitoring said event signals; and
   said second PMU further comprises a second programmable selector configured to programmably select one or more of said plurality of second input devices to allocate performance counters for monitoring said event signals;
   wherein said first programmable selector comprises one or more programmable counter configuration registers adapted for configuring selected one or more of said first plurality of input devices to receive certain event signals from certain processor cores associated with the first functional group; and
   said second programmable selector comprises one or more programmable counter configuration registers adapted for configuring selected one or more of said second plurality of input devices to receive certain event signals from certain processor cores associated with the second functional group.

2. The system as claimed in claim 1, further comprising a component accessible by at least one of said processor units for reading a count value from one or more respective performance counters, and for writing a value to one or more respective performance counters.

3. The system as claimed in claim 1, including one or more non-processor devices, each non-processor device being associated with a single one of the first functional group and the second functional group, each of said first and second plurality of performance counters adapted for receiving and counting signals representing occurrences of events received from one or more non-processor devices associated with only one of the functional groups.

4. The system as claimed in claim 3, wherein said one or more non-processor devices include devices selected from the group of: a network interface device, a floating point computation device, a memory storage device, a vector computation device or specialized computation device, a device for system initialization and testing, and a temperature monitoring, voltage monitoring or some other sensor monitoring device.

5. The system as claimed in claim 1, wherein said programmably selecting one or more of said first and second plurality of input devices enables monitoring of up to Nmax events, simultaneously, from any single processor unit, where Nmax is limited by the number of performance counters M in a respective PMU, is limited by a number of performance counters Mp allocated for receiving processor events, or is limited by a number of performance monitor events per processor Np, whichever is smallest: Nmax=min(M, Mp, Np).

6. The system as claimed in claim 5, wherein all M performance counters count signals representative of events that change at the same operating frequency.

7. The system as claimed in claim 5, wherein said allocated number of performance counters Mp count signals representative of events that change at a higher operating frequency, and a remaining M−Mp counters count signals representative of events changing at a lower operating frequency.

8. The system as claimed in claim 1, wherein each of said input devices comprise a multiplexor device.

9. The system as claimed in claim 1, wherein: said first programmable selector allocates performance counters for simultaneously monitoring said event signals from each respective processor unit as needed for individual application performance tuning tasks; and
   said second programmable selector allocates performance counters for simultaneously monitoring said event signals from each respective processor unit as needed for individual application performance tuning tasks.

10. The system as claimed in claim 1, wherein said plurality of processor units include also one or more local performance counters within a respective processor, the respective local counters being used only by the respective local processor.

11. A method for monitoring event signals from one or more processor or non-processor units in a multiprocessor system, each processor and non-processor unit for generating signals representing occurrences of events at said processor or non-processor unit, each processor and non-processor unit being associated with a single one of a plurality of functional groups, said method comprising:
  providing a first plurality of performance counters, each performance counter of the first plurality of performance counters for counting signals representing occurrences of events from one or more processor units or non-processor units associated with only a first one of the functional groups;
  providing a first plurality of input devices, each input device of the first plurality of input devices for receiving said event signals from one or more processor units or non-processor units associated with the first functional group, said first plurality of input devices programmable to select event signals for receipt by one or more of said first plurality of performance counters for counting;
  providing a second plurality of performance counters, each performance counter of the second plurality of performance counters for counting signals representing occurrences of events from one or more processor units or non-processor units associated with only a second one of the functional groups; and
  providing a second plurality of input devices, each input device of the second plurality of input devices for receiving said event signals from one or more processor units or non-processor units associated with the second functional group, said second plurality of input devices programmable to select event signals for receipt by one or more of said second plurality of performance counters for counting;
  providing at least a first performance monitoring unit (PMU) and a second performance monitoring unit (PMU); wherein each PMU is shared between the one or more processor or non-processor units;
  wherein said first PMU further comprises a first programmable selector configured to programmably select one or more of said plurality of first input devices to allocate performance counters for monitoring said event signals; and said second PMU further comprises a second programmable selector configured to programmably select one or more of said plurality of second input devices to allocate performance counters for monitoring said event signals;
  wherein said first programmable selector comprises one or more programmable counter configuration registers adapted for configuring selected the one or more of said first plurality of input devices to receive certain event signals from certain processor cores associated with the first functional group; and
  said second programmable selector comprises one or more programmable counter configuration registers adapted for configuring selected one or more of said second plurality of input devices to receive certain event signals from certain processor cores associated with the second functional group.

12. The method as claimed in claim 11, wherein said providing a first plurality of input devices and a second plurality of input devices comprises implementing logic at said each PMU for:
  identifying a type of current event signal received from a respective processor or non-processor unit;
  determining if a respective performance counter is configured for receiving said current event signal; and, if a performance counter is configured for receiving said current event signal, identifying a respective processor core generating said current event signal; and
  determining if a respective performance counter is configured for receiving said current event signal from said identified processor core.

13. The method as claimed in claim 11, wherein said providing a first plurality of input devices and a second plurality of input devices comprises implementing logic for:
  determining if a respective performance counter is associated with a current event signal received;
  identifying one or more respective counters associated with the current event;
  determining if the identified one or more counters is associated with the current event type and a respective current processing core; and
  identifying the one or more counters that is associated with the current processor core and with the current event type.

* * * * *